(12) United States Patent
Fatemi et al.

(10) Patent No.: US 11,811,352 B2
(45) Date of Patent: Nov. 7, 2023

(54) PROPULSION SYSTEM HAVING MULTIPLE MOTORS WITH COMPLEMENTARY TORQUE BANDS

(71) Applicant: GM Global Technology Operations LLC, Detroit, MI (US)

(72) Inventors: Alireza Fatemi, Canton, MI (US); Thomas W. Nehl, Shelby Township, MI (US); Norman K. Bucknor, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 30 days.

(21) Appl. No.: 17/339,143

(22) Filed: Jun. 4, 2021

(65) Prior Publication Data
US 2022/0393620 A1 Dec. 8, 2022

(51) Int. Cl.
*H02P 25/18* (2006.01)
*H02P 5/485* (2016.01)
*B60K 1/02* (2006.01)
*B60K 17/02* (2006.01)
*B60L 15/20* (2006.01)
*B60K 17/356* (2006.01)

(52) U.S. Cl.
CPC ............... *H02P 5/485* (2016.02); *B60K 1/02* (2013.01); *B60K 17/02* (2013.01); *B60L 15/20* (2013.01); *B60K 17/356* (2013.01); *B60L 2210/40* (2013.01)

(58) Field of Classification Search
CPC ........... B60L 15/20; B60K 17/02; B60K 1/02; H02P 5/485; H02P 25/188
USPC ........................................................... 318/45
See application file for complete search history.

(56) References Cited

U.S. PATENT DOCUMENTS

| 9,487,105 | B2 * | 11/2016 | Kim | B60L 15/20 |
| 9,559,566 | B2 * | 1/2017 | DiMarco | H02K 7/108 |
| 9,762,152 | B2 * | 9/2017 | Yamada | B60L 15/02 |
| 2020/0136535 | A1 * | 4/2020 | Cha | H02P 25/188 |

* cited by examiner

*Primary Examiner* — Cortez M Cook
(74) *Attorney, Agent, or Firm* — Vivacqua Crane PLLC

(57) ABSTRACT

The present disclosure discloses a vehicle propulsion system. The vehicle propulsion system includes a first electric machine including a first set of machine windings that are configured to cause a rotor to rotate about an axis to selectively drive a transmission during a first vehicle operating state and a second electric machine including a second set of machine windings that are configured to cause a rotor to rotate about an axis selectively drive the transmission during at least one of the first vehicle operating state or a second vehicle operating state. The second vehicle operating state different from the first operating state, and a number of series turns per phase for the first set of machine windings is different from a number of series turns per phase for the second set of machine windings.

20 Claims, 4 Drawing Sheets

PROPULSION SYSTEM HAVING MULTIPLE MOTORS WITH COMPLEMENTARY TORQUE BANDS

INTRODUCTION

The present disclosure relates to a vehicle electric propulsion system. More particularly, the present disclosure relates an electric propulsion system with dual electric machines.

Some vehicles have deployed electric axles and other electric motor arrangements to deliver and/or augment drive to vehicle wheels. Multi-speed transmissions in electric axle and other electric drivetrain arrangements provide speed conversion functionality in certain vehicles. Multi-speed transmissions may enable the electric motor to operate more efficiently over a wider range of operation conditions in comparison to single speed transmissions.

SUMMARY

According to several aspects, a vehicle propulsion system is disclosed. The vehicle propulsion system includes a first electric machine including a first set of machine windings that are configured to cause a rotor to rotate about an axis to selectively drive a transmission during a first vehicle operating state and a second electric machine including a second set of machine windings that are configured to cause a rotor to rotate about an axis selectively drive the transmission during at least one of the first vehicle operating state or a second vehicle operating state. The second vehicle operating state different from the first operating state, and a number of series turns per phase for the first set of machine windings is different from a number of series turns per phase for the second set of machine windings.

In other features, the vehicle propulsion system includes a controller operatively connected to the first electric motor and the second electric motor, wherein the controller is configured to transmit control signals to the first electric machine during the first vehicle operating state to cause the first electric machine to drive the transmission.

In other features, the controller is configured to transmit control signals to the second electric machine during the second vehicle operating state to cause the second electric machine to drive the transmission.

In other features, the first operating state corresponds to a first torque band to operate a vehicle in a low-power driving state.

In other features, the second operating state corresponds to a second torque band to operate a vehicle in a high-power driving state.

In other features, the first electric machine includes a power converter and a traction motor, the traction motor including the first set of machine windings.

In other features, the power inverter comprises a set of semiconductor switches that are configured to convert direct current (DC) power to alternating current (AC) power.

In other features, the second electric machine includes a power converter and a traction motor, the traction motor including the second set of machine windings.

In other features, the first electric machine includes a clutch that selectively engages the transmission in the first vehicle operating state.

In other features the second electric machine includes a clutch that selectively engages the transmission in the second vehicle operating state.

According to several aspects, a vehicle propulsion system is disclosed. The vehicle propulsion system includes a first electric machine including a first set of machine windings that are configured to cause a rotor to rotate about an axis to selectively drive a first transmission during a first vehicle operating state and a second electric machine including a second set of machine windings that are configured to cause a rotor to rotate about an axis selectively drive a second transmission during a second vehicle operating state. The vehicle propulsion system also includes a controller operatively connected to the first electric motor and the second electric motor. The controller is configured to transmit control signals to the first electric machine during the first vehicle operating state to cause the first electric machine to drive the transmission. The second vehicle operating state different from the first operating state, and a number of series turns per phase for the first set of machine windings is different from a number of series turns per phase for the second set of machine windings.

In other features, the controller is configured to transmit control signals to the second electric machine during the second vehicle operating state to cause the second electric machine to drive the transmission.

In other features, the first operating state corresponds to a first torque band to operate a vehicle in a low-power driving state.

In other features, the second operating state corresponds to a second torque band to operate a vehicle in a high-power driving state.

In other features, the first electric machine includes a power converter and a traction motor, the traction motor including the first set of machine windings.

In other features, the second electric machine includes a power converter and a traction motor, the traction motor including the second set of machine windings.

In other features, the traction motor of the first electric machine is magnetically identical to the traction motor of the second electric machine but for the number of series turns per phase.

In other features, the first electric machine includes a clutch that selectively engages the transmission in the first vehicle operating state.

In other features the second electric machine includes a clutch that selectively engages the transmission in the second vehicle operating state.

According to several aspects, a method is disclosed. The method can include receiving a torque request signal, comparing a torque value corresponding to the torque request signal to a current operating state of a vehicle, and causing at least one of a first electric machine or a second electric machine to propel the vehicle based on the comparison. The first electric machine includes a first set of machine windings and the second electric machine includes a second set of machine windings, and a number of series turns per phase for the first set of machine windings is different from a number of series turns per phase for the second set of machine windings.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Battery electric vehicles (BEVs) can include propulsion systems that are driven by electric machines including a power inverter and a traction motor. Typically, these electric machines are configured to efficiently produce torque during certain modes of operation. For example, a conventional machine with a constant power speed ratio of greater than three can suffer from field weakening losses and under-utilized motor power. However, a wide torque band machine can be obtained by reducing the number of series turns per phase to offer higher power and lower high-speed losses with a loss penalty on cycle efficiency.

As discussed herein, a vehicle can include a propulsion system that includes a first electric machine having characteristics that correspond to a first torque band and a second electric machine having characteristics that correspond to second torque band. The vehicle can include a controller that selects which electric machine propels the vehicle based on the torque request signal to allow for optimum vehicle performance for normal, e.g., commuter, and high-performance driving states. For example, during a commuter driving state, the controller selects the electric machine having characteristics corresponding to a first torque band. During a high-performance driving state, e.g., minimal power and torque loss at revolutions-per-minute over eight thousand, the controller can select the electric machine having characteristics corresponding to a second torque band. The controller can select which electric machine propels the vehicle based on an operational state of the vehicle. The operational state can correspond to a revolutions-per-minute (RPM) value of the vehicle, or the like.

As used herein, the commuter driving state can be referred to as a low-power driving state, and the high-performance driving state can be referred to as a high-power driving state. A low-power driving state can be defined as a vehicle driving mode in which a total propulsion power of the vehicle is less than or equal to twenty percent (20%) and a vehicle speed may be less than or equal to fifty miles per hour (50 mph). A high-power driving state may be defined as a vehicle driving mode in which the total propulsion power of the vehicle is greater than or equal to eighty percent (80%) in order for the vehicle to reach its maximum vehicle speed. In some instances, the total propulsion power of the vehicle in the high-power driving state may be substantially more than eighty percent, i.e., at least five percent (5%) greater.

Figure 1:
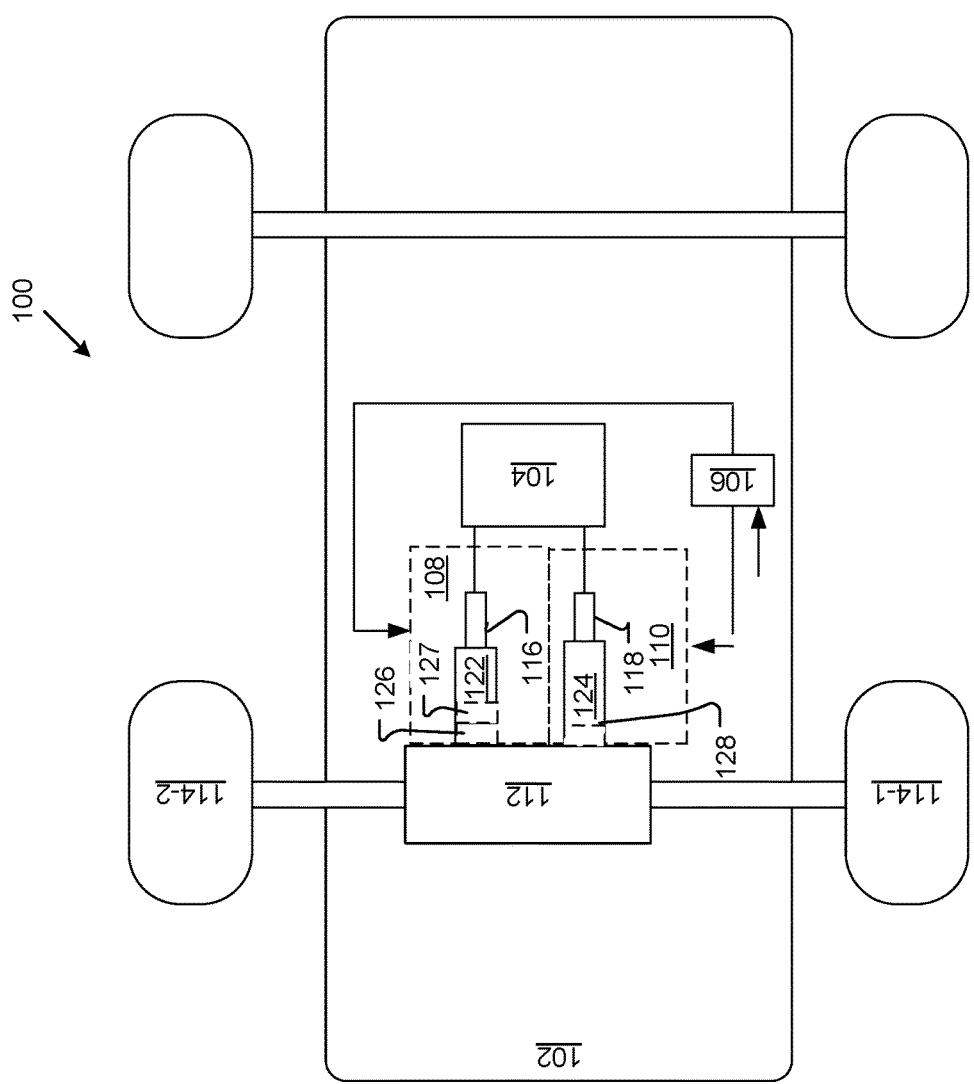
FIG. 1 is a block diagram of a vehicle propulsion system according to an example implementation.

FIG. 1 illustrates an example propulsion system 100 of a vehicle 102 according to an example implementation. In various implementations, the vehicle 102 comprises a battery electric vehicle (BEV). The propulsion system 100 can comprise vehicle 102 components, such as powertrain and/or traction drive components of a vehicle, whose ordinary functions may include powering a traction motor to generate and deliver motor torque to a drive wheels for propulsion of the vehicle or for performing other useful work aboard the vehicle 102. As shown, the propulsion system 100 can include a battery 104, a controller 106, a first electric machine 108, and a second electric machine 110.

In an example implementation, the battery 104 can comprise an onboard rechargeable energy storage system (RESS) that may include one or more high-voltage, independently rechargeable battery packs adapted for storing high-voltage electrical energy used for propelling an electric-drive vehicle. The RESS may be a deep-cycle, high-ampere capacity battery system rated for approximately four hundred (400) to approximately eight hundred (800) volts direct current (VDC) or more, for example, depending on a desired vehicle range, gross vehicle weight, and power ratings of the various loads drawing electrical power from the RESS.

The controller 106 can include at least one processor and sufficient memory for storing computer-readable instructions. The memory includes tangible, non-transitory memory, e.g., read only memory, whether optical, magnetic, flash, or otherwise. The controller 106 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry. The controller 106 can receive request signals from one or more electronic control units (ECUs) of the vehicle represented by an arrow. For example, an ECU associated with the vehicle 102 may provide a torque increase request signal. Based on the torque request signal, the controller 106 can transmit a control signal to one or more switches that control deliverance of electrical power to the first electric machine 108 and/or the second electric machine 110. As discussed below, the electrical machines 108, 110 may include clutches that selectively engage a transmission to propel the vehicle based on the torque request signal.

In the implementation illustrated in FIG. 1, the first electric machine 108 and the second electric machine 110 are connected to a transmission 112. More specifically, the first electric machine 108 and the second electric machine 110 can be rotatably connected to an input shaft of the transmission 112. In some implementations, the transmission 112 may have a fixed gearing relationship that provides a single gear ratio between the input shaft and an output shaft of the transmission 112. A torque converter or a launch clutch may be disposed between the first electric machine 108 and the transmission 112. In this implementation, another torque converter or another launch clutch may be disposed between the second electric machine 110 and the transmission 112. In another example implementation, the transmission 112 may be a multiple step-ratio automatic transmission.

The output shaft of the transmission 112 can be connected to a differential that drives wheels 114-1, 114-2 via an axle 116 that is connected to the differential. The differential transmits approximately equal torque to each wheel 114-1, 114-2 while permitting slight speed differences such as when the vehicle turns a corner. Different types of differentials or similar devices may be used to distribute torque from the powertrain to one or more wheels. In some applications, torque distribution may vary depending on the operating state or condition. Within the present disclosure, the axle 116 may be referred to as a fully electronic axle assembly, or an "e-axle" assembly.

The first electric machine 108 and the second electric machine 110 each include a respective power inverter 118, 120 and a respective traction motor 122, 124, which are described in greater detail below.

During a first operating state, the vehicle 102 can be driven via the first electric machine 108, and the vehicle 102 can be driven via the second electric machine 110 during a second operating state. In an example implementation, the first operating state can comprise operating the vehicle 102 at a torque value within a first torque band, and the second operating state can comprise operating the vehicle 102 at a torque value within a second torque band. Torque bands can represent a relationship of torque as a function of revolutions-per-minute (RPMs) and power. For example, a battery electric vehicle having a particular propulsion system has a base speed measured in revolutions-per-minute that corresponds to optimum operating efficiency, i.e., minimal energy loss for the particular propulsion system. The base speed can be determined based on the traction motor parameters, i.e., number of machine winding turns, operating voltage, power inverter type, etc. In other words, if the speed of the vehicle increases beyond the base speed, the traction motor experiences energy loss and/or torque loss.

Based on the vehicle operating state, the controller 106 can select the first electrical machine 110 so that the first electrical machine 110 drives the transmission 112. In another example, based on the vehicle operating state, the controller 106 can select the second electrical machine 112 so that the second electrical machine 112 drives the transmission 112. In an example implementation, the controller 106 can transmit control signals to power inverters of the corresponding electrical machine 108, 110 such that the selected electrical machine 108, 110 is operational and the other of the electrical machine 108, 110 is idle. In another example implementation, the electrical machines 108, 110 may include a respective clutch 126, 128 that selectively engages the input shaft of the transmission 112. In this implementation, the clutch 126, 128 of the idle electrical machine 108, 110 is disengaged.

Figure 2:
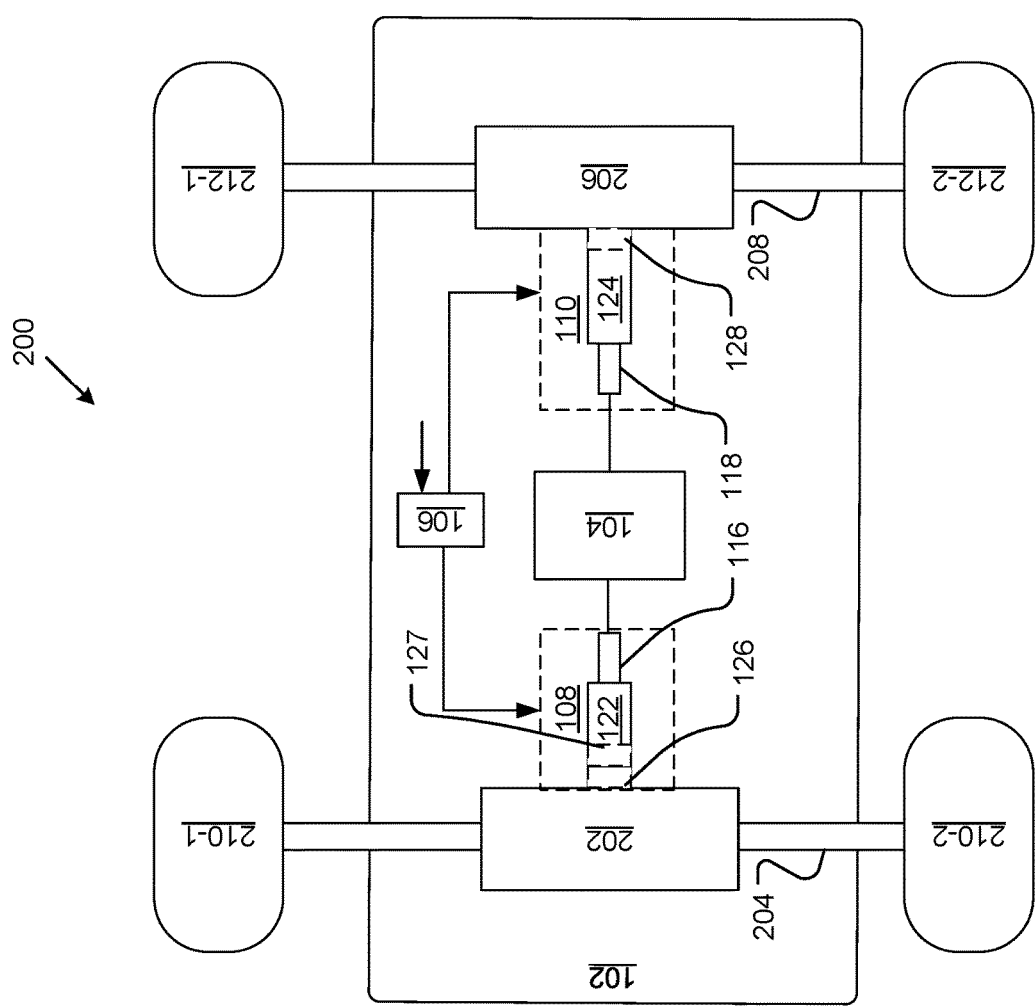
FIG. 2 is a block diagram of another vehicle propulsion system according to another example implementation.

FIG. 2 illustrates an example propulsion system 200 for the vehicle 102 according to another example implementation of the present disclosure. As shown, the vehicle 102 can include two e-axle assemblies. For example, the vehicle 102 can include a first transmission 202 that is operatively connected to a first axle 204 and can include a second transmission 206 that is operatively connected to a second axle 208. The vehicle 102 also includes the first electric machine 108 that is operatively connected to the first transmission 202 and the second electric machine 110 that is operatively connected to the second transmission 206. The first transmission 202 can drive the first axle 204, and the second transmission 206 can drive the second axle 208. As shown, a first set of wheels 210-1, 210-2 are connected to the first axle 204, and a second set of wheels 212-1, 212-2 are connected to the second axle 208. In this implementation, the clutch 126 of the first electrical machine 108 can selectively engage the input shaft of the transmission 204 when operational, and the clutch 128 of the second electrical machine 110 can engage the input shaft of the transmission 206 when operational.

As discussed herein, the controller 106 determines the vehicle operating state based on the torque request signal and selects the electrical machine 108, 110 to propel the vehicle 102 based on the vehicle operating state. The torque request signal can be generated based on a position of a pedal within the vehicle 102, or the like. For example, an ECU of the vehicle 102 can receive an electrical signal from the pedal. Based on the electrical signal, the ECU accesses a lookup table that relates electrical signal values to torque values.

In certain conditions, both electric machines 108, 110 can operate simultaneously to maximize power throughput, to optimize efficiency, and/or to reduce shifting transients in the case of a multi-speed transmission. In some implementations, the electric machines 108, 110 may operate simultaneously when the vehicle 102 is operating in the low-power driving state and the electric motor 108, 110 configured to operate during the high-power driving state provides intermittent supplementary torque. In other implementations, the electric motors 108, 110 may operate simultaneously when the vehicle 102 is operating in the high-power driving state.

Figure 3:
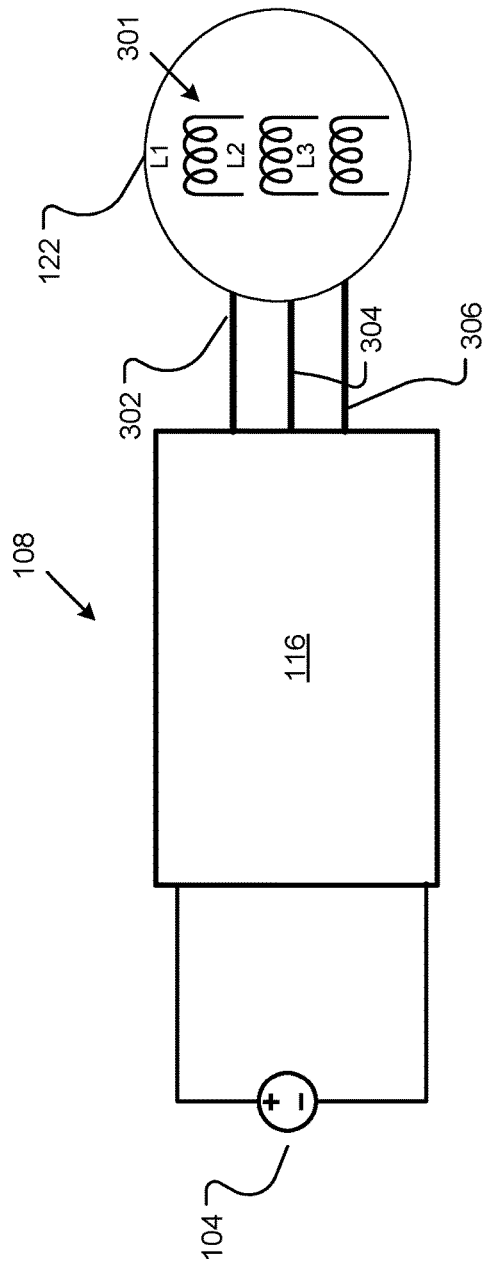
FIG. 3 is a block diagram of a first electric machine for the vehicle propulsion system according to an example implementation.
Figure 4:
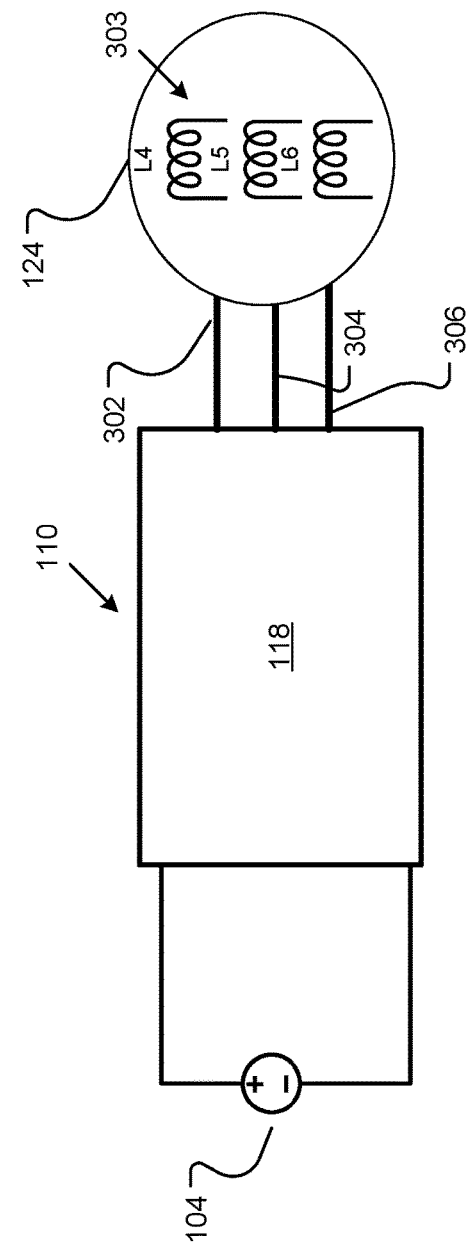
FIG. 4 is a block diagram of a second electric machine for the vehicle propulsion system according to an example implementation.

Referring to FIGS. 3 and 4, the first electric machine 108 includes the power inverter 116 and the traction motor 122, and the second electric machine 110 includes the power inverter 116 and the traction motor 124. The respective power inverters 116, 118 govern the transmission of electrical energy to and from the corresponding traction motor 122, 124.

Referring to FIG. 3, the traction motor 122 includes a first set 301 of machine windings L1, L2, and L3 that provide three-phase current to create a rotating magnetic field to rotate a rotor of the traction motor 122. Depending on the implementation of the present disclosure, the rotor of the traction motor 122 can be connected to an input shaft of the corresponding transmission. For example, the clutch 126 may be located between the rotor and the output shaft of the transmission.

Referring to FIG. 4, the traction motor 124 includes a second set 303 of machine windings L4, L5, and L6 that provide three-phase current to create a rotating magnetic field to rotate a rotor of the traction motor 124. Depending on the implementation of the present disclosure, the rotor of the traction motor 124 can be connected to an input shaft of the corresponding transmission. For example, the clutch 128 may be located between the rotor and the output shaft of the transmission. While described above as three-phase current, it is understood that the traction motors 122, 124 can include additional machine windings to provide additional phases. For example, the phases may be between three- and six-in some implementations. In other implementations, traction motors may extend to nine-phase.

The vehicle 102 can be propelled via at least one of the first electric machine 108 or the second electric machine 110. The first set 301 of machine windings L1, L2, and L3 differ with respect to the second set of 303 of machine windings L4, L5, and L6. For example, the first set 301 of machine windings L1, L2, and L3 can correspond to the first torque band, and the second set 303 of machine windings L4, L5, and L6 can correspond to the second torque band. In an example implementation, the first set 301 of machine windings L1, L2, and L3 may have a number of series turns per phase that is less than a number of series turns per phase for the second set 303 of machine windings L4, L5, and L6. In this implementation, the first set 301 of machine windings L1, L2, and L3 can correspond to the first torque band, and the second set 303 of machine windings L4, L5, and L6 corresponds to the second torque band. A torque band ratio between the first electric machine 108 and the second electric machine 110 can vary depending on vehicle operating state and/or available battery 104 voltage.

As discussed above, the first set 301 of machine windings L1, L2, and L3 comprises a number of series turns per phase that is different from the second set 303 of machine windings L4, L5, and L6. For example, the number of series turns per phase for machine windings L1, L2, and L3 may be less than the number of series turns per phase for the machine windings L4, L5, and L6, e.g., the machine windings L4, L5, and L6 have a greater number of series turns per phase. However, but for the difference in the number of series turns per phase, the first electric machine 108 is identical in magnetic design with the second electric machine 110. In an example implementation, the first electric machine 108 including machine windings L1, L2, and L3, i.e., the electric machine having a larger torque band, may include a multiple-speed transmission 127 integrated therein.

The power inverters 116, 118 can each include a set of semiconductor switches (also referred to herein as "inverter switches") that cooperatively convert direct current (DC) power from the battery 104 to alternating current (AC) power for powering the corresponding traction motor 122, 124 via high frequency switching during vehicle operation. Each semiconductor switch may be embodied as a voltage-controlled switching device in the form of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), other wideband-gap (WBG) or ultra-wideband-gap semiconductor power switching device (UWBG), or other suitable switch having a corresponding gate to which a gate signal is applied to change the on/off state of a given switch. There is typically at least one pair of semiconductor switches for each leg phase 302, 304, 306 of the three-phase traction motor 122, 124, and each phase leg phase 302, 304, 306 of the power inverter 116, 118 is connected to a corresponding machine phase terminal, e.g., one of the machine windings of the corresponding traction motor 122, 124.

Figure 5:
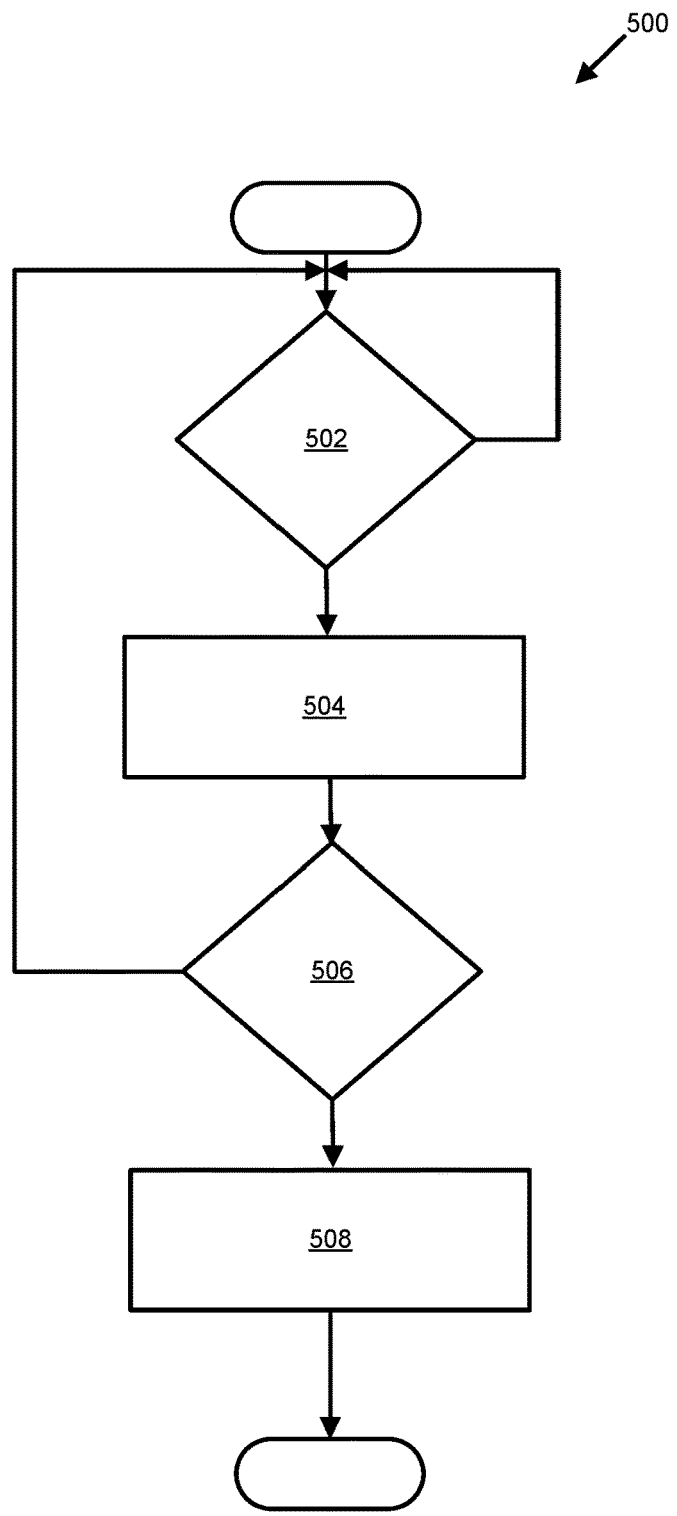
FIG. 5 is flow chart illustrating an example process for selecting an electric machine to propel a vehicle based on a torque request signal according to an example implementation.

FIG. 5 is a flowchart of an example process 500 for selecting an electric machine 108, 110 for propelling the vehicle 102. Blocks of the process 500 can be executed by the controller 106. The process 500 begins at block 502 in which a determination is made of whether a torque request signal has been received. If no torque request signal is received, the process 500 returns to block 502.

Otherwise, at block 504, the controller 106 compares a torque value corresponding to the torque request signal to a current operating state of the vehicle 102. The current operating state may be defined as the low-power driving state or a high-power driving state, such as increased vehicle speeds or wide-open throttle (WOT) conditions. The controller 106 can include a lookup table that relates torque values to vehicle operating states and the losses associated with the electric motor and the power inverter. In some examples, controller logic accounts for pre-calibrated losses for efficiency optimization as to which electric machine 108, 110 should operate at defined load level.

At block 506, the controller 106 determines whether to switch from one electric machine, e.g., one of electric machine 108 or 110, to the other electric machine, e.g., the other one of electric machine 108 or 110, based on the comparison. For example, based on the comparison, the torque value may indicate that the vehicle 102 will be operating in an increased vehicle operating state relative to the current vehicle operating state. In another example, based on the comparison, the torque value may indicate that the vehicle 102 will be operating in a decreased vehicle operating state relative to the current vehicle operating state. As such, based on the comparison, the controller 106 can determine which electric machine 108, 110 to use for optimization purposes since the first electric machine 108 includes machine windings configured for the first torque band and the second electric machine 110 includes machine windings configured for the second torque band.

If the controller 106 determines that no switch is needed, the process 500 returns to block 502. Otherwise, the controller 106 generates one or more control signals to cause one of the electric machines 108, 110 to transition between an operating state and an idle state such that the other one of the electric machines 108, 110 propels the vehicle 102 at block 508. For example, the controller 106 can transmit control signals to the corresponding power inverter 116, 118 to control operation of the inverter switches. In another example, the controller 106 can transmit control signals to the corresponding clutches 126, 128 to selectively engage or disengage with the input shaft of the transmission. When the vehicle 102 is operating in a high-power driving state, the controller 106 can select the electric machine 108, 110 having machine windings that have the least number of series turns per phase. When the vehicle 102 is operating in the low-power driving state, the controller 106 can select the electric machine 108, 110 having machine windings that have the greater number of series turns per phase. The process 500 then ends.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle propulsion system comprising:
a first electric machine including a first set of machine windings that are configured to cause a rotor to rotate about an axis to selectively drive a transmission during a first vehicle operating state; and
a second electric machine including a second set of machine windings that are configured to cause a rotor to rotate about an axis selectively drive the transmission during at least one of the first vehicle operating state or a second vehicle operating state, the second vehicle operating state different from the first operating state,
wherein a total number of series turns per phase for the first set of machine windings is different from a total number of series turns per phase for the second set of machine windings.

2. The vehicle propulsion system of claim 1, further comprising a controller operatively connected to the first electric machine and the second electric machine, wherein the controller is configured to transmit control signals to the first electric machine during the first vehicle operating state to cause the first electric machine to drive the transmission.

3. The vehicle propulsion system of claim 2, wherein the controller is configured to transmit control signals to the second electric machine during the second vehicle operating state to cause the second electric machine to drive the transmission.

4. The vehicle propulsion system of claim 1, wherein the first operating state corresponds to a first torque band to operate a vehicle in a low-power driving state.

5. The vehicle propulsion system of claim 4, wherein the second operating state corresponds to a second torque band to operate a vehicle in a high-power driving state.

6. The vehicle propulsion system of claim 1, wherein the first electric machine includes a power converter and a traction motor, the traction motor including the first set of machine windings.

7. The vehicle propulsion system of claim 6, wherein the power inverter comprises a set of semiconductor switches that are configured to convert direct current (DC) power to alternating current (AC) power.

8. The vehicle propulsion system of claim 1, wherein the second electric machine includes a power converter and a traction motor, the traction motor including the second set of machine windings.

9. The vehicle propulsion system of claim 1, wherein the first electric machine includes a clutch that selectively engages the transmission in the first vehicle operating state.

10. The vehicle propulsion system of claim 1, wherein the second electric machine includes a clutch that selectively engages the transmission in the second vehicle operating state.

11. A vehicle propulsion system comprising:
a first electric machine including a first set of machine windings that are configured to cause a rotor to rotate about an axis to selectively drive a first transmission during a first vehicle operating state;
a second electric machine including a second set of machine windings that are configured to cause a rotor to rotate about an axis selectively drive a second transmission during a second vehicle operating state, the second vehicle operating state different from the first operating state and the second transmission different from the first transmission; and
a controller operatively connected to the first electric machine and the second electric machine, wherein the controller is configured to transmit control signals to the first electric machine during the first vehicle operating state to cause the first electric machine to drive the transmission,
wherein a total number of series turns per phase for the first set of machine windings is different from a total number of series turns per phase for the second set of machine windings.

12. The vehicle propulsion system of claim 11, wherein the controller is configured to transmit control signals to the second electric machine during the second vehicle operating state to cause the second electric machine to drive the transmission.

13. The vehicle propulsion system of claim 11, wherein the first operating state corresponds to a first torque band to operate a vehicle in a low-power driving state.

14. The vehicle propulsion system of claim 13, wherein the second operating state corresponds to a second torque band to operate a vehicle in a high-power driving state.

15. The vehicle propulsion system of claim 11, wherein the first electric machine includes a power converter and a traction motor, the traction motor including the first set of machine windings.

16. The vehicle propulsion system of claim 15, wherein the second electric machine includes a power converter and a traction motor, the traction motor including the second set of machine windings.

17. The vehicle propulsion system of claim 16, wherein the traction motor of the first electric machine is magnetically identical to the traction motor of the second electric machine but for the number of series turns per phase.

18. The vehicle propulsion system of claim 11, wherein the first electric machine includes a clutch that selectively engages the transmission in the first vehicle operating state.

19. The vehicle propulsion system of claim 11, wherein the second electric machine includes a clutch that selectively engages the transmission in the second vehicle operating state.

20. A method comprising:
receiving a torque request signal;
comparing a torque value corresponding to the torque request signal to a current operating state of a vehicle;
causing at least one of a first electric machine or a second electric machine to propel the vehicle based on the comparison, the first electric machine having a first set of machine windings and the second electric machine having a second set of machine windings, wherein a total number of series turns per phase for the first set of machine windings is different from a total number of series turns per phase for the second set of machine windings.

* * * * *